May 27, 1969  MASARU KOGA  3,445,899
METHOD OF JOINING AN ENDLESS BELT TOGETHER AND DEVICE THEREFOR
Filed April 3, 1967

INVENTOR
MASARU KOGA

BY Browne, Schuyler & Beveridge
ATTORNEY

United States Patent Office 3,445,899
Patented May 27, 1969

3,445,899
METHOD OF JOINING AN ENDLESS BELT TOGETHER AND DEVICE THEREFOR
Masaru Koga, 21, 14, Fujigaoka-cho, Suita-shi, Osaka-fu, Japan
Filed Apr. 3, 1967, Ser. No. 627,741
Int. Cl. F16g 3/07
U.S. Cl. 24—37                    5 Claims

ABSTRACT OF THE DISCLOSURE

Any belting for a V-belt or a plain belt is cut into predetermined lengths. Then, said belting is curved in a loop form, and its end portions are brought into contact with each other, and along the end portions, their faces and backs are brought into contact with a face joint and a back joint respectively. Inclined pins fit from the face joint into the back joint and secure the end portions firmly. The inclined pins are inclined substantially radially with the center of the axis of the pulley as their center. In addition, vertical pins fit from the face joint into the belt in a direction at right angles to the surface of the belt which is moving forward in a rectilinear direction.

The inclined pins perform a natural connecting operation against a pull when the connecting part comes forward on the pulley and its form is curved. And when the connecting part moves forward in a rectilinear direction, the vertical pins perform a natural connecting operation. Thus, each kind of pin takes a share in performing its own connecting operation. There is no unnatural, unbalanced pull between the belt and a joint metal fitting.

BACKGROUND OF THE INVENTION

It is known in the art to curve a belt in a loop form and to form an endless belt by joining its ends together.

When the connecting device advances on the pulley, it will move forward in a curved direction according to the pulley arc; when not at the pulley it will move forward in a rectilinear direction. When a connecting device that is so designed as to be most suitable for the rectilinear motion of a belt, comes over a pulley and moves forward into a curved form, the belt is pulled unevenly so that a portion thereof is pulled violently at the connecting device while the remaining portion thereof is pulled weakly. Thus, such a device has a defect which causes the belt to be damaged or broken early.

On the other hand, when a connecting device that is designed as to be most suitable for a curved motion of a belt, moves forward in a rectilinear direction, the belt is pulled more violently at the opposite portion to the former case. Thus, this device has a different defect which reduces the durability of the belt.

So far there has been no durable connecting device for a belt which is not pulled unnaturally when it moves forward in a rectilinear direction and in a curved direction alternately.

But the connecting device of the present invention can be used quite suitably for both cases in which it moves forward in a rectilinear direction and in a curved direction alternately, and the belt is pulled quite naturally and smoothly in both cases. Thus, the connecting device of the present invention allows the belt to run machinery smoothly, and makes the belt last longer by eliminating causes for its early damage or breakdown. It may be said, therefore, that the connecting device of the present invention has a remarkable effect.

SUMMARY OF THE INVENTION

This invention relates to a method of joining an endless belt together, whether it be a V-belt or a plain belt, and a device therefor characterized in that the belt is provided with a plurality of means, each of which performs its allotted work respectively in one case where a connecting device part moves forward in a curved direction and in another case where it moves forward in a rectilinear direction.

An important object of the present invention is to provide a connecting device which will uniformly stress a belt whether the connecting device is moving forward in a curved direction or in a rectilinear direction.

Another object is to increase the durability of the belt splice.

Still another object is to protect a belt from early damage or breakdown and thereby to increase in the production efficiency by reducing a possibility of the suspension of machine operations arising from such early damage or breakdown.

BRIEF DESCRIPTION OF THE DRAWINGS

Attached drawings show two embodiments of the present invention.

DESCRIPTION OF THE PREFERRED EMBODIMENTS

Example 1

Figure 1:
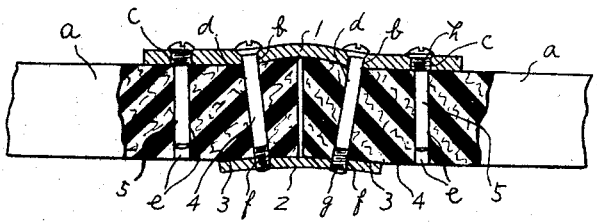
FIGURE 1 is a sectional view of a connecting device according to this invention.

This example relates to a connecting device for a V-belt and describes pins in a single-line arrangement. The numeral 1 designates a face joint. The face joint 1 has the same width as that of the belt surface with its sides being slightly curved in an angled form. Holes b, b for inclined pins and screw holes c, c for vertical screw pins are made in a line in its longitudinal direction.

The numeral 2 designates a back joint, the width of which is as wide as that of the back of the V-belt. Inclined screw holes f, f are made on said back joint 2 which has a more or less slightly angled curve that corresponds with the curve of the face joint 1. The letters a, a represent the end portions of the belt on which holes d, d for inclined pins and holes e, e for vertical pins are made. The numeral 3 designates a slightly inclined side of the upper surface of the back joint 2. The numerals 4, 4 designate inclined pins which fit from the inclined pin holes b, b of the face joint 1 through the inclined pin holes d, d of the end portions of the belt into the inclined pin screw holes f, f of the back joint 2, and secure them firmly. The end portions of said inclined pins, which are designated by screws g, g, are screwed into said inclined pin screw holes f, f to secure them firmly.

The numerals 5, 5 designate vertical pins. The bases of said vertical pins 5, 5, which are secured by screws h, h, are screwed into the vertical screw holes c, c of the face joint 1, and the remaining parts thereof fit into the vertical pin holes e, e of the end portions of the belt.

As has been described above, both end portions a, a of the V-belt are in contact with the face joint 1 and with the back joint 2 respectively from the face and back of the end portions a, a, which are firmly secured by means of the inclined pins 4, 4 and the vertical pins 5, 5 and thereby an endless V-belt in a loop form is formed.

Example 2

This example relates to a connecting device for a flat belt and describes a device having lock pins in a plurality of lines. Letters B, B designate cut end portions of a flat belt. After the body of the flat belt is curved into a loop form, said cut end portions B, B are made to come in contact with each other. As in the case of Example 1, both the face side and back side of said cut end portions B, B are in contact with a face joint 1 and with the back joint 2 respectively. The widths of the face joint 1 and the back joint 2 are respectively made to correspond with the width of the flat belt, and pin holes b, b, c, c, f, f, etc. are made on both said face joint 1 and said back joint 2 in a plurality of lines; and pins 4 and 5 likewise fit into these holes in a plurality of lines and secure them firmly to form an endless flat belt.

Figure 2:
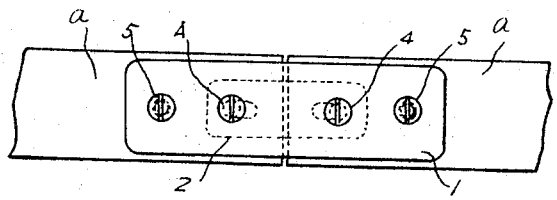
FIGURE 2 is a plan view of the connecting device in a single-line pin arrangement as in a V-belt.
Figure 3:
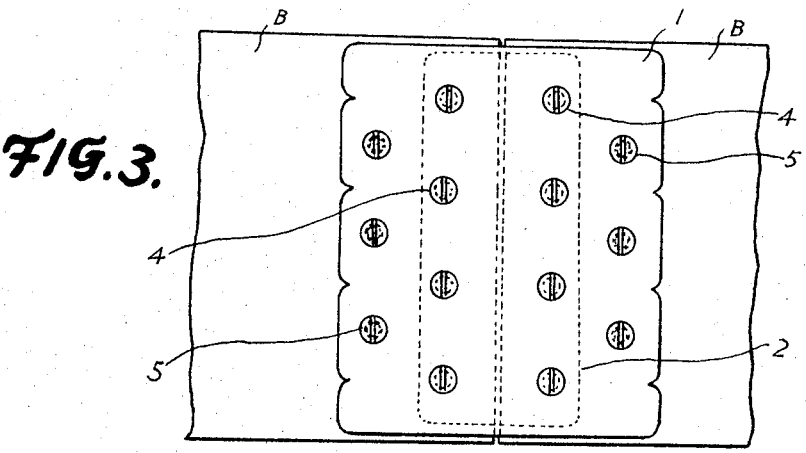
FIGURE 3 is a plan view of the connecting device in a double-line arrangement for a flat belt.

The example of FIG. 2 shows inclined pins 4 and vertical pins 5 arranged in a straight line in a longitudinal direction; the example of FIG. 3 shows staggered pins optionally employed for flat belts.

Figure 4:
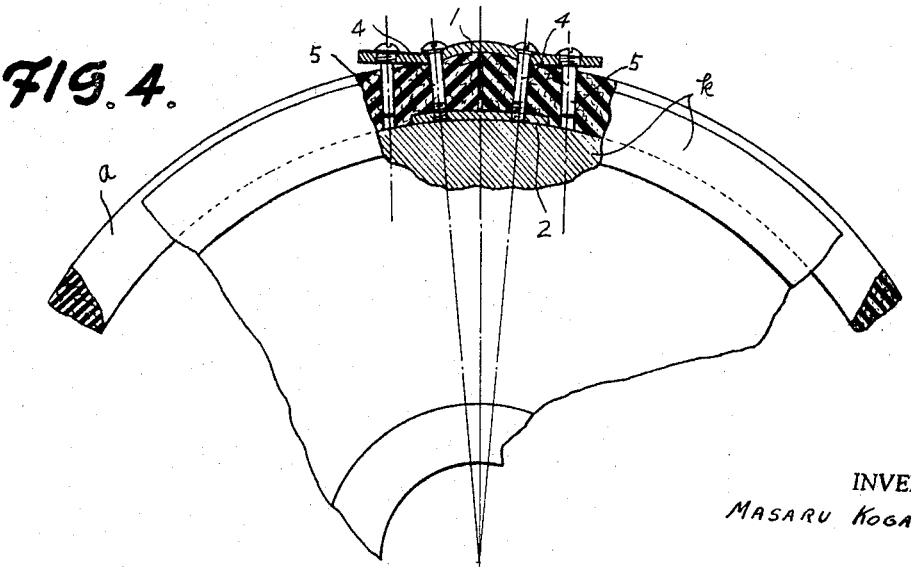
FIGURE 4 is a fragmentary sectional view of a connecting device as it passes round a pulley.

The device of the present invention has a construction as has been described above, and an endless belt provided with the device of the present invention has the following advantages:

In a case when said connecting device advances over a pulley k and assumes a curved form, as shown in FIGURE 4, the inclined pins, the face joint and the back joint operate in such a manner as to pull on such element uniformly. There is no danger, therefore, that a partial, uneven pull is given to the walls of pin holes of the belt, and so a uniformly stressed connection can be maintained throughout.

In a case when the connecting device leaves the pulley k and moves forward in a rectilinear direction, the vertical pins 5 and the face joint 1 interact on each other, independently of the back joint 2, and are connected with each other at right angles to the surface of the belt. Thus, a pull is mainly given to the connecting portion, and each portion of the belt which is moving forward in a rectilinear direction receives a uniform force throughout. There is no danger, therefore, that a partial, uneven pull is given to the pin holes.

By means of the connecting device of the present invention, a stress given by pins to the pin holes of the belt over the pulley maintains a uniform condition, and there is no danger that damage or breakdown occurs in a neighbourhood of the pin holes. Thus, the device of the present invention is able to prevent an early failure of the belt and thereby to prolong its life to a marked degree. Durability tests show that it lasts several times longer than the conventional belt. Thus, it is found that the belt provided with the device of the present invention has the following effects: It is able to reduce troubles of production arising from the suspension of machine operations on account of an early damage or breakdown of the belt, and is thereby able to increase the production efficiency of the machinery.

I claim:

1. A splicing unit for fastening adjacent ends of a belt, comprising
a pair of plate members for engaging inner and outer faces of adjacent belt ends, said members having curvature at the central portions thereof corresponding generally to the curvature of a pulley over which the spliced belt is adapted to pass,
paired through pins joining said plate members and said belt ends, the pins of each pair perpendicularly passing through the respective ends of the belt when curved substantially according to such pulley,
further paired pins secured to one of said members extending into respective said belt ends at right angles to the belt when extended between pulleys, said further paired pins being disposed more remotely from said belt ends than said through pins.

2. A unit according to claim 1, said plate members including an inner member curved throughout substantially the length thereof and an outer member curved at the center and having therebeyond ends adapted for receiving adjacently thereto linearly extending belt portions for holding said further pins.

3. A unit according to claim 2, said further pins being secured at right angles to said linearly disposed ends.

4. A belt end fastening, comprising
a pair of belt ends arranged end to end,
a pair of opposed outer and inner plate-like members engaging outer and inner faces of said belt ends,
first pin members securing said belt ends between said plate-like members, being relatively inclined approximately at the angle of respective radii thereat from the center of rotation of a pulley on which the belt is adapted for use,
said plate-like members having accurate portions extending from said belt ends substantially to said pins,
said pin members passing through said belt ends substantially perpendicularly thereto, respectively, when passing said pulley,
the outer said member having linear extensions at either end thereof, and
second paired pin members extending from said extensions inwardly substantially through portions of the belt proximate to said ends being secured in substantially mutually parallel relation and perpendicularly to belt portions linearly extending beyond said first pin members.

5. A fastening according to claim 4, including plural pairs of inclined and parallel pin members arranged, respectively, in rows across said belt ends.

References Cited

UNITED STATES PATENTS

| 804,898 | 11/1905 | Tarbuck | 24—37 |
| 1,327,798 | 1/1920 | Backstrom | 24—33 |
| 1,443,210 | 1/1923 | Bradshaw | 24—36 |

FOREIGN PATENTS

| 18,325 | 1882 | Germany. |
| 12,036 | 1881 | Germany. |

DONALD A. GRIFFIN, *Primary Examiner.*